United States Patent Office 2,731,389
Patented Jan. 17, 1956

2,731,389

RECOVERING VITAMIN B₁₂ MATERIALS FROM ORGANIC OXIME SOLUTIONS OF THE SAME WITH AMINES

Jerry Robert D. McCormick, New City, N. Y., and Siegfried A. Muller, Westwood, N. J., assignors to American Cyanamid Company, New York, N. Y., a corporation of Maine No Drawing. Application November 7, 1951,
Serial No. 255,324

11 Claims. (Cl. 167—81)

This invention relates to the recovery of materials having vitamin B12 activity from organic solutions of the same and more particularly to the recovery of materials having vitamin B12 activity from solvents having an oxime group.

The value of materials having vitamin B12 activity in treating certain dietary deficiencies is now well established and well known by those skilled in the art. Materials having vitamin B12 activity comprise a number of similar cobalt complexes in which the cobalt ion is believed to be in coordination with various other groups, for instance a cyano group or a hydroxyl group. These compounds have been given various names to distinguish them from one another even though all have approximately the same biological activity. For instance vitamin B12 has a cyano group in coordination with the cobalt ion and vitamin B12b has a hydroxy group in coordination with the cobalt ion. Fortunately these compounds have roughly the same chemical and physical properties and may usually be separated and purified by identical procedures. In fact, vitamin B12 usually occurs naturally in combination with other members of the vitamin B12 family and a procedure suitable for recovering the vitamin B12 also usually results in the recovery of the other material having vitamin B12 activity. As these compounds do have such similar chemical and physical properties, the entire group will be referred to in this specification and claims simply as materials having vitamin B12 activity.

In the various vitamin B12 purification procedures it is usually necessary at one or more stages of the procedure to form a solution of the vitamin B12 material in organic solvents. For instance an organic solvent may be employed to extract a solid mixture of impurities and vitamin B12 material; an organic liquid may be employed to extract an aqueous solution of the vitamin B12 material; or an organic solvent may be employed to elute vitamin B12 material from an adsorbent substance on which it has been adsorbed. In the past it has usually been necessary in recovering the vitamin B12 material from such organic solvents to dilute the organic solution with a second organic liquid which is miscible therewith but which has practically no solvent power for the vitamin B12 material. This procedure has the disadvantage that large volumes of the nonsolvent liquid must be employed in order to obtain a satisfactory recovery of the vitamin material. In fact it has usually been found to be necessary to use a volume of nonsolvent as much as ten times as great as the original volume of the vitamin B12 solution. As organic solvents are expensive and as a mixture of organic solvents is often difficult to separate, the recovery of vitamin B12 material from an organic solution of the same by such a procedure amounts to a great deal of trouble and expense. By the procedure of this invention the above difficulties are overcome and vitamin B12 may be recovered from a solution of the same in certain organic solvents with a minimum of difficulty.

Oxime type materials have recently been found to be highly selective solvents for vitamin B12 substances and are useful in various purification procedures. For instance certain aldoximes and ketoximes are disclosed in copending application S. N. 255,322 filed concurrently herewith to be suitable in various solid-liquid and liquid-liquid extraction procedures and various nitro-oximes or nitrolic acids are disclosed in copending application S. N. 255,323 filed concurrently herewith as being suitable solvents in like procedures. The presence of the oxime group ($>C=N-OH$) in a compound adds materially to its selectivity and solvent power for vitamin B12 material and other compounds having the oxime group in addition to those constituting the subject matter of the above mentioned copending applications may be employed as solvents for substances having vitamin B12 activity.

According to the procedure of this invention a solution of vitamin B12 material in an organic solvent having an oxime group ($>C=N-OH$) is treated with an amine in approximately stoichiometrical amounts. The resulting mixture has very little solvent power for vitamin B12 material so that the same is easily recovered. This is very surprising in view of the fact that many amines are in themselves quite excellent solvents for vitamin B12 material. For instance pyridine is sometimes employed as a solvent for vitamin B12. In fact, the procedure of this invention may be employed to recover vitamin B12 material from two solutions simultaneously, the first solution being one of vitamin B12 material in a solvent having an oxime group and the second being a solution of vitamin B12 in an amine solvent.

While applicants do not wish to be limited by theory, it is reasonably certain that the reason for the success of the new process of this invention is that the amine neutralizes the effectiveness of the oxime group in imparting to the oxime type solvents their desirable properties as solvents for vitamin B12 material. This is believed to be due to the formation of a loosely bound complex between the oxime group in the oxime type solvent and the amine group in the amine and in this specification and claims the product resulting from the addition of the amine to the oxime type solvent is referred to as an oxime-amine complex.

The new process of this invention has several advantages over prior art procedures, one of the most important being that only approximately stoichiometrical amounts of the amine are necessary. This results in the use of much smaller quantities of reagents and therefore effects a considerable reduction in operating expense. The use of smaller volumes also enables one to operate with less equipment and less storage capacity and this also lowers operating costs. An additional advantage of the new process of this invention is that it results in a more complete recovery than is usually obtained by prior art procedures. As vitamin B12 material occurs naturally in only minute quantities, a high recovery of the vitamin material is necessary in order for a process to be commercially satisfactory.

As mentioned above, the oxime-amine complex which is formed in the process of this invention has very little solvent power for vitamin B12 material. Therefore, when one treats a suitable solution of vitamin B12 material in an oxime type solvent with an amine, a precipitate of the vitamin material is obtained and this precipitate can be recovered by filtration, centrifugation, decantation or other conventional methods of separation. A second method of recovering the vitamin material from the oxime-amine complex comprises extracting the vitamin from the complex with an aqueous solvent. The oxime-amine complexes have a very low distribution coefficient with respect to water for the vitamin material, or, in other words, when a solution of vitamin B12 material in an oxime-amine complex which is in interfacial contact with an aqueous solvent has reached equilibrium, the concentration of the vitamin material in the aqueous phase will be found to be many times higher than the concentration of the vitamin material in the organic phase. Therefore, by aqueous extraction of the oxime-amine complex, exceptionally high recoveries can be effected. Of course in some instances it is possible to employ a combination of the above two methods so that the oxime-amine complex is first filtered and then extracted with water.

If the vitamin B12 material is to be recovered from the amine by filtration, various expedients may be employed to increase the recovery. For instance the solution may be chilled to a low temperature to decrease even further the solubility of the vitamin material therein. If the vitamin material is to be recovered from the oxime-amine complex by aqueous extraction, any of the common procedures may be employed. For instance, in small scale extraction one may simply mix the desired quantity of aqueous solvent with the oxime-amine complex, thoroughly mix the two, allow separation into two phases and recover the aqueous phase. On larger scale operation one may employ countercurrent or cocurrent extraction. Since aqueous extraction is the preferred procedure for recovering the vitamin material from the oxime-amine complex, it will be described in greater detail in subsequent paragraphs.

A solution of vitamin B12 material in almost any oxime type material in which it is possible to form a solution of vitamin B12 is satisfactory for the new process of this invention. As a general rule the oxime type solvents may be represented by the following structural formula:

in which $R_1$ represents hydrogen, $NO_2$, a lower alkanoyl group, or a hydrocarbon radical, and in which $R_2$ represents a lower alkanoyl group or a hydrocarbon radical. The oxime in which the vitamin B12 material is dissolved should preferably have a melting point below about 100° C. This is especially true if it is intended that the resulting oxime-amine complex be extracted with an aqueous solvent. Solutions of vitamin B12 material in higher melting oximes may be often employed if they are liquified with other solvents such as butyl alcohol or if the oxime-amine complex is not to be water extracted. As a general rule solutions in which the oxime has fewer than about 10 carbon atoms will usually be found to be most satisfactory. If the oxime-amine complex is to be satisfactorily extracted with an aqueous solvent to recover the vitamin material, it is also important that a solution be employed wherein the oxime forms a complex with the selected amine which is not unduly soluble in water.

Any basic amine, i. e., any amine having a pKb value of less than 11, may be employed in the process of this invention with the highly basic secondary and tertiary amines being preferred. Of course, an amine should be employed which is a liquid at temperatures below about 100° C. and if the oxime-amine complex is to be satisfactorily extracted with water an amine should be employed which forms a complex with the selected oxime which is not unduly water soluble. The solubility of any oxime-amine complex can be readily determined by one skilled in the art. Among the most satisfactory amines are pyridine and the pyridine bases such as the picolines, lutidines and the collidines. This group of amine bases form oxime-amine complexes which are relatively water insoluble and which have an extremely low distribution coefficient with regard to water for vitamin B12 material. They are, therefore, highly advantageous in forming complexes which are to be water extracted to recover the vitamin B12 material. Other amines which are quite satisfactory may be illustrated by the following: triethylamine, N-butylamine, 2-ethylhexylamine, dimethylaniline, ethylmorpholine and phenylethylamine. Amines which form water miscible complexes with many of the oxime type solvents may be employed if the only recovery of the vitamin material is to be by filtration, but should not be employed if aqueous extraction of the complex is contemplated. Examples of such amines or ethanolamine and the lower alkylamines such as methylamine.

The procedure for forming the oxime-amine complex comprises simply adding the two materials together. In other words, the amine may be added to the oxime solution of vitamin material or the oxime material may be added to the amine. The addition may be made within a relatively wide range of temperatures although certain factors which will be apparent to those skilled in the art must be observed. For instance, if a relatively high melting oxime is employed, a temperature above the melting point of the oxime and below the boiling point of the amine should be employed. Likewise, temperatures above about 100° C. should not be employed since vitamin B12 becomes increasingly unstable in the presence of oximes at such temperatures. Generally speaking room temperature, i. e., 20° C. to 40° C., is preferred unless one is limited to a higher temperature by the physical characteristics of the reagents employed. The amine should be added in approximately stoichiometrical amounts since either the oxime or the amine is usually capable of acting as a solvent for the vitamin B12 material and an excess of either material will lower the efficiency of the process. However, satisfactory results are usually obtained if the amount of amine employed does not vary more than about 15% from a stoichiometrical amount and therefore careful determinations of quantities are not necessary.

The concentration of the vitamin material in the oxime solvent to be treated may vary within wide limits. For instance, the oxime solution may be a saturated solution of vitamin B12 material or even have vitamin B12 material in suspension in excess of its solubility. As will be apparent to those skilled in the art the lower limit of the concentration of vitamin B12 material in the oxime solution is determined by the efficiency of the process and this varies with particular reagents and conditions. Generally speaking, with the most efficient amines such as 1,2-lutidine, 2,4-lutidine, 2,6-lutidine, gamma-picoline, beta-picoline, or commercial mixtures of such amines, and employing aqueous extraction of the oxime-amine complex, a satisfactory recovery can be obtained from solutions of vitamin B12 in oxime type solvents containing as little as about 0.05 gamma of vitamin B12 per milliliter of solution.

As mentioned above, if the oxime-amine complex is not water soluble, the preferred method of recovering the vitamin material from this complex comprises extracting the complex with an aqueous solvent. This extraction may be performed by any of the procedures known by those skilled in the art to be suitable for liquid-liquid extraction. At least in relatively large scale operation the preferred procedure comprises countercurrent extraction as this procedure results in excellent interfacial contact of the two liquids; however in smaller scale operations batch extraction may be found to be more satisfactory due to other factors. The volume of aqueous solvent employed depends upon several factors including the distribution coefficient with respect to water for vitamin B12 material of the particular oxime-amine complex employed. If the oxime-amine complex has a very low distribution coefficient such as one formed with 2,4-lutidene, smaller quantities of aqueous solvent need be employed than in the case of an oxime-amine complex which has a relatively high distribution coefficient with regard to water such as one formed from triethylamine. About 1% by volume of water will extract most of the vitamin B12 from an oxime-amine complex formed from 2,4-lutidine when a five stage countercurrent extraction system is employed. Generally speaking, the use of about 10% to 25% by volume of water in a two or three stage countercurrent extraction system is to be preferred.

The aqueous extraction may be performed at any temperature which is above the freezing point of the aqueous solvent and the oxime-amine complex and which is below the boiling point of the aqueous solvent. Generally speaking low temperatures, for instance 5° C. to 35° C. are preferred. It is one of the advantages of the new process of this invention that no pH adjustment need be made to the aqueous solvent which means that the extraction will ordinarily be performed at a neutral or slightly basic pH. A highly acidic aqueous solvent tends to destroy the oxime-amine complex, thus resulting in the liberation and transfer to the aqueous phase of the amine salt. Generally speaking, a hydrogen ion concentration in the aqueous phase of from about pH 5 to about pH 10 is satisfactory.

This invention will be more particularly illustrated by the following specific examples in which all parts are by weight unless otherwise indicated.

Example I 5 parts by volume of an aqueous solution of crude vitamin B12 material assaying 21 gammas of vitamin B12 activity per ml. and having a dry-basis potency of 168 gammas of vitamin B12 per gram of total solids was extracted twice with 1 part by volume portions of benzaldehyde oxime. The combined oxime extracts were washed with 2 parts by volume of distilled water and the wash discarded. To the washed oxime extracts there was added 2 parts by volume of water and 2 parts by volume of pyridine. The mixture was shaken and centrifuged. The separated aqueous phase assayed 41 gammas of B12 activity per ml. and had a dry-basis potency of 1,835 gammas of B12 activity per gram of total solids. In other words, a more than ten-fold purification was achieved in a single purification step.

Example II

To 1 part by volume of an aqueous solution containing 41 gammas of vitamin B12 material per ml., there was added 0.5 part by volume of a saturated ammonium sulfate solution. The resulting mixture was gently warmed and shaken with 0.2 part by volume of molten 3-oximino-pentanedione-2,4. The organic phase was separated, leaving an almost white aqueous phase, thus showing that substantially all of the vitamin B12 had been transferred to the oxime. The oxime solution of vitamin B12 material was treated with 0.2 part by volume of aldehydin (2-methyl-5-ethylpyridine). There was then added 0.5 part by volume of water, the mixture well shaken and then centrifuged. The aqueous layer was separated and found to contain substantially all of the vitamin B12 material in a purified state.

Example III

To 0.5 part by volume of a pink solution of vitamin B12 material assaying 41 gammas of B12 activity per ml., there was added 0.5 part by volume of water plus 0.5 part by volume of saturated ammonium sulfate solution and 0.1 part by volume of molten biacetyl monoxime. The mixture was gently warmed and then well shaken. The aqueous phase became colorless and the organic phase became red in color, thus showing that the vitamin B12 material had been transferred to the organic phase. To the organic phase, there was added 0.2 part by volume of aldehydin and this mixture was shaken with 1.5 parts by volume of aqueous solvent. The vitamin B12 material was thus transferred to the aqueous phase, which was separated, and the vitamin B12 material recovered.

Example IV

A 0.5 part by volume portion of a pink vitamin B12 solution was shaken with 0.1 part by volume of molten salicylaldoxime. Substantially all the pink coloration entered the solvent phase, and the aqueous phase became essentially colorless. When the solvent extract was shaken with 0.1 part by volume of pyridine and 0.5 part by volume of water, the aqueous phase became pink and the organic phase was colorless.

Example V

A sample of *Streptomyces olivaceous* mash was adjusted to pH 1.8 and heated to 50° C., then cooled to 30° C. and filtered. The filtrate was adjusted to pH 9.2 and filtered. A 300 ml. portion of this filtrate was extracted with 5×15 ml. of benzaldoxime. To the 72 ml. of oxime extract assaying 2.5 gammas of B12 activity per ml., there was added an equal volume of aldehydin (2-methyl-5-ethylpyridine), and the organic phase was extracted with 4×10 ml. of water. The recovered aqueous phase, 39 ml., assayed 5.4 gammas of B12 activity per ml.

In place of the collidine (2-methyl-5-ethylpyridine) employed in this example one can substitute other pyridine bases with equally satisfactory results. For instance one can substitute 2-picoline, 2,4-lutidine or 2,6-lutidine for the collidine of this example without appreciably affecting the recovery of vitamin B12 activity.

Example VI

A sample of a pink solution containing 40 gammas of B12 per ml. was diluted with an equal volume of saturated brine and shaken with a small volume of ethane nitrolic acid. Substantially all the pink color entered the organic phase. The colorless aqueous phase was removed and replaced by an equal volume of distilled water. When a volume of 2-methyl-5-ethylpyridine equal to twice the volume of nitrolic acid was added and the mixture shaken, practically all of the pink color entered the aqueous phase.

We claim:

1. The method which comprises mixing together a liquid oxime solvent solution of vitamin B12 material, said oxime solvent having a melting point below about 100° C., and a quantity of pyridine, said quantity of pyridine being approximately molecularly equivalent to the quantity of said oxime solvent, said pyridine base having a melting point below about 100° C. and said solution of vitamin B12 material having a concentration of at least 0.05 gamma of vitamin B12 activity per ml., bringing the resulting oxime-pyridine mixture into interfacial contact with an aqueous solvent whereby vitamin B12 material is transferred to the aqueous phase, said aqueous solvent having a temperature of about 0° C. to 100° C. and a pH of about 5 to 10, and separating the aqueous phase containing vitamin B12 activity.

2. The method which comprises adding to a solution of vitamin B12 material in benzaldehyde oxime, said solution having a concentration of at least 0.05 gamma of vitamin B12 activity per ml. of solution, a quantity of pyridine, said quantity of pyridine being approximately a molecular equivalent of the quantity of said benzaldehyde oxime, bringing the resulting vitamin B12 mixture into interfacial contact with a quantity of aqueous solvent, said quantity of aqueous solvent being at least equal to 1/100 of the volume of said vitamin B12 mixture and said aqueous solvent having a temperature of about 5° C. to 35° C. and a hydrogen ion concentration of about pH 5 to pH 10, and separating the aqueous phase containing vitamin B12 activity.

3. A method of recovering vitamin B12 material from a solution of said material in an organic solvent consisting essentially of an oxime, which comprises treating said solution with a quantity of an amine having a $pK_b$ value of less than 11, said quantity being sufficient to furnish approximately one amino group for each oxime group in said organic solution, and said amine having a melting point below about 100° C. and recovering from said mixture vitamin $B_{12}$.

4. A method of recovering vitamin $B_{12}$ from solution in a liquid oxime organic solvent which comprises adding to said solution a quantity of amine having a $pK_b$ value of less than 11 approximately molecularly equivalent to the quantity of said oxime solvent and recovering from said mixture vitamin $B_{12}$.

5. A method of recovering vitamin $B_{12}$ from solution in an organic solvent consisting essentially of an oxime which comprises adding to said solution a quantity of secondary amine having a $pK_b$ value of less than 11 approximately molecularly equivalent to the quantity of said oxime solvent and recovering from said mixture vitamin $B_{12}$.

6. A method of recovering vitamin $B_{12}$ from solution in an organic solvent consisting essentially of an oxime which comprises adding to said solution a quantity of tertiary amine having a $pK_b$ value of less than 11 approximately molecularly equivalent to the quantity of said oxime solvent and recovering from said mixture vitamin $B_{12}$.

7. A method of recovering vitamin $B_{12}$ from solution in an organic solvent consisting essentially of an oxime which comprises adding to said solution a quantity of pyridine approximately molecularly equivalent to the quantity of said oxime solvent and recovering from said mixture vitamin $B_{12}$.

8. A method of recovering vitamin $B_{12}$ from solution in an organic solvent consisting essentially of an oxime which comprises adding to said solution a quantity of a lutidine approximately molecularly equivalent to the quantity of said oxime solvent and recovering from said mixture vitamin $B_{12}$.

9. A method of recovering vitamin $B_{12}$ from solution in an organic solvent consisting essentially of an oxime which comprises adding to said solution a quantity of a picoline approximately molecularly equivalent to the quantity of said oxime solvent and recovering from said mixture vitamin $B_{12}$.

10. A method of recovering vitamin $B_{12}$ from solution in an organic solvent consisting essentially of an oxime which comprises adding to said solution a quantity of a collidine approximately molecularly equivalent to the quantity of said oxime solvent and recovering from said mixture vitamin $B_{12}$.

11. A method of recovering vitamin $B_{12}$ from solution in an organic solvent consisting essentially of an oxime which comprises adding to said solution a quantity of an aldehydin approximately molecularly equivalent to the quantity of said oxime solvent and recovering from said mixture vitamin $B_{12}$.

References Cited in the file of this patent

UNITED STATES PATENTS

| | | |
|---|---|---|
| 2,361,373 | Alles | Oct. 31, 1944 |
| 2,394,092 | Nabenhauer | Feb. 5, 1946 |
| 2,530,416 | Wolf | Nov. 21, 1950 |
| 2,563,794 | Rickes | Aug. 7, 1951 |

OTHER REFERENCES

Fantes: Proceedings of the Royal Society (1950), pp. 592 to 598.